(12) United States Patent
Levin et al.

(10) Patent No.: US 12,224,982 B2
(45) Date of Patent: Feb. 11, 2025

(54) DISTRIBUTED IDENTITY-BASED FIREWALL POLICY EVALUATION

(71) Applicant: Palo Alto Networks, Inc., Santa Clara, CA (US)

(72) Inventors: Liron Levin, Kefar Sava (IL); Eran Yanay, Modiin (IL); Dima Stopel, Herzliya (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/489,392

(22) Filed: Oct. 18, 2023

(65) Prior Publication Data
US 2024/0073185 A1     Feb. 29, 2024

Related U.S. Application Data

(63) Continuation of application No. 16/930,732, filed on Jul. 16, 2020, now Pat. No. 11,838,267.

(51) Int. Cl.
*H04L 9/40* (2022.01)
(52) U.S. Cl.
CPC ........ *H04L 63/0236* (2013.01); *H04L 63/101* (2013.01); *H04L 63/126* (2013.01)
(58) Field of Classification Search
CPC . H04L 63/0236; H04L 63/101; H04L 63/126; H04L 63/0876; H04L 63/0263
See application file for complete search history.

(56) References Cited

U.S. PATENT DOCUMENTS

| | | | |
|---|---|---|---|
| 8,677,489 B2 | 3/2014 | Strebe et al. | |
| 9,491,261 B1* | 11/2016 | Shagam | H04L 67/133 |
| 9,621,361 B2 | 4/2017 | Bugenhagen et al. | |
| 2010/0054133 A1* | 3/2010 | Schuringa | H04L 69/22 |
| | | | 370/241 |
| 2011/0093716 A1* | 4/2011 | Liu | H04L 9/3247 |
| | | | 713/176 |
| 2012/0128151 A1 | 5/2012 | Boehm et al. | |
| 2013/0097600 A1* | 4/2013 | Cardona | G06F 9/45558 |
| | | | 718/1 |
| 2018/0159865 A1* | 6/2018 | Lau | H04W 4/80 |
| 2019/0036652 A1* | 1/2019 | Baghel | H04L 1/1628 |
| 2020/0389437 A1* | 12/2020 | Miller | H04L 63/0236 |

* cited by examiner

*Primary Examiner* — Amie C. Lin
(74) *Attorney, Agent, or Firm* — Gilliam IP PLLC (57) ABSTRACT

Methods and systems for identity-based firewall policy evaluation and for encoding entity identifiers for use in identity-based firewall policy evaluation. A packet from a sender entity to a recipient entity is intercepted. A determination is made whether the sender entity is permitted to communicate with the recipient entity according to a firewall policy, wherein the firewall policy indicates a plurality of entity identifiers, and each entity identifier is unique among the plurality of entity identifiers. Rules for communications among the plurality of entities include a list of pairs of entities which are permitted to communicate with each other. The packet is forwarded to the recipient entity when it is determined that the sender entity is permitted to communicate with the recipient entity. At least one mitigation action is performed when it is determined that the recipient entity is not permitted to communicate with the sender entity.

20 Claims, 5 Drawing Sheets

DISTRIBUTED IDENTITY-BASED FIREWALL POLICY EVALUATION

TECHNICAL FIELD

The present disclosure relates generally to communications between applications, and more particularly to firewalls used for communications between applications.

BACKGROUND

In distributed computing, it may be desirable for security purposes to ensure that certain applications only communicate with other, trusted applications. Additional requirements may include allowing certain applications to only communicate with certain other applications via trusted domains.

Some existing solutions utilize Internet Protocol (IP) addresses to enforce policy rules with respect to trusted applications. For example, existing solutions may utilize a firewall that is configured to check IP addresses of applications communicating with a protected entity in order to ensure that only trusted applications communicate with the protected entity. These existing solutions scan many incoming packets in order to identify the IP address of the entity sending the packets.

Existing solutions face challenges with enforcing such policy requirements. One of the main issues with IP-based solutions is that they do not function properly in dynamic environments where the IP addresses of entities are continuously changing as the mapping between IP addresses change. Because of this continuous change, existing IP-based solutions may inaccurately determine trusted status and, as a result, can introduce security vulnerabilities. Additionally, such enforcement cannot function properly when a load balancer is being utilized.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identity-based firewall policy evaluation. The method comprises: intercepting a packet directed to a recipient entity, wherein the packet is sent by a sender entity; determining whether the sender entity is permitted to communicate with the recipient entity according to a firewall policy, wherein the firewall policy indicates a plurality of entity identifiers and rules for communications among a plurality of entities including the recipient entity, each entity identifier corresponding to a respective entity of the plurality of entities, wherein each entity identifier is unique among the plurality of entity identifiers, wherein the rules for communications among the plurality of entities include a list of pairs of entities which are permitted to communicate with each other; forwarding the packet to the recipient entity when it is determined that the sender entity is permitted to communicate with the recipient entity; and performing at least one mitigation action when it is determined that the recipient entity is not permitted to communicate with the sender entity.

Certain embodiments disclosed herein also include a non-transitory computer readable medium having stored thereon causing a processing circuitry to execute a process, the process comprising: intercepting a packet directed to a recipient entity, wherein the packet is sent by a sender entity; determining whether the sender entity is permitted to communicate with the recipient entity according to a firewall policy, wherein the firewall policy indicates a plurality of entity identifiers and rules for communications among a plurality of entities including the recipient entity, each entity identifier corresponding to a respective entity of the plurality of entities, wherein each entity identifier is unique among the plurality of entity identifiers, wherein the rules for communications among the plurality of entities include a list of pairs of entities which are permitted to communicate with each other; forwarding the packet to the recipient entity when it is determined that the sender entity is permitted to communicate with the recipient entity; and performing at least one mitigation action when it is determined that the recipient entity is not permitted to communicate with the sender entity.

Certain embodiments disclosed herein also include a system for identity-based firewall policy evaluation. The system comprises: a processing circuitry; and a memory, the memory containing instructions that, when executed by the processing circuitry, configure the system to: intercept a packet directed to a recipient entity, wherein the packet is sent by a sender entity; determine whether the sender entity is permitted to communicate with the recipient entity according to a firewall policy, wherein the firewall policy indicates a plurality of entity identifiers and rules for communications among a plurality of entities including the recipient entity, each entity identifier corresponding to a respective entity of the plurality of entities, wherein each entity identifier is unique among the plurality of entity identifiers, wherein the rules for communications among the plurality of entities include a list of pairs of entities which are permitted to communicate with each other; forward the packet to the recipient entity when it is determined that the sender entity is permitted to communicate with the recipient entity; and perform at least one mitigation action when it is determined that the recipient entity is not permitted to communicate with the sender entity.

Certain embodiments disclosed herein also include a method for encoding entity identifiers for use in identity-based firewall policy evaluation. The method comprises: intercepting a packet sent by a sender entity to a recipient entity, the packet including a header, wherein the sender entity and the recipient entity are subject to a firewall policy, wherein the firewall policy indicates a plurality of entity identifiers and rules for communications among a plurality of entities including the sender entity and the recipient entity, each entity identifier corresponding to a respective entity of the plurality of entities, wherein each entity identifier is unique among the plurality of entity identifiers, wherein the rules for communications among the plurality of entities include a list of pairs of entities which are permitted to communicate with each other; computing a signature based on the entity identifier of the sender entity; and adding the signature to the header of the packet.

Certain embodiments disclosed herein also include a non-transitory computer readable medium having stored thereon causing a processing circuitry to execute a process, the process comprising: intercepting a packet sent by a sender entity to a recipient entity, the packet including a header, wherein the sender entity and the recipient entity are subject to a firewall policy, wherein the firewall policy indicates a plurality of entity identifiers and rules for communications among a plurality of entities including the sender entity and the recipient entity, each entity identifier corresponding to a respective entity of the plurality of entities, wherein each entity identifier is unique among the plurality of entity identifiers, wherein the rules for communications among the plurality of entities include a list of pairs of entities which are permitted to communicate with each other; computing a signature based on the entity identifier of the sender entity; and adding the signature to the header of the packet.

Certain embodiments disclosed herein also include a system for encoding entity identifiers for use in identity-based firewall policy evaluation. The system comprises: a processing circuitry; and a memory, the memory containing instructions that, when executed by the processing circuitry, configure the system to: intercept a packet sent by a sender entity to a recipient entity, the packet including a header, wherein the sender entity and the recipient entity are subject to a firewall policy, wherein the firewall policy indicates a plurality of entity identifiers and rules for communications among a plurality of entities including the sender entity and the recipient entity, each entity identifier corresponding to a respective entity of the plurality of entities, wherein each entity identifier is unique among the plurality of entity identifiers, wherein the rules for communications among the plurality of entities include a list of pairs of entities which are permitted to communicate with each other; compute a signature based on the entity identifier of the sender entity; and add the signature to the header of the packet.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that existing solutions cannot readily evaluate compliance with firewall rules based on unique entity identifiers. Rather, such existing solutions utilize Internet Protocol (IP) addresses. However, use of IP addresses instead of unique identifiers may lead to inaccurate identifications of systems and programs communicating with the system or program protected by the firewall. As a result, such existing solutions that cannot evaluate firewall rules based on entity identifiers are less secure than solutions which utilize entity identifiers.

To address the issues noted above with respect to enforcing policy requirements for communications between applications, the disclosed embodiments provide techniques for identity-based firewall evaluation. The disclosed embodiments allow for evaluating application-to-application identity firewall policies in a distributed, efficient, and secure manner.

The example disclosed embodiments include techniques for providing distributed identity-based firewall policy evaluation. The disclosed embodiments are utilized to protect one or more entities designated as protected entities. The disclosed embodiments enforce a firewall policy that defines rules for communications between entities. Each entity has an entity identifier that is unique among entity identifiers indicated in the firewall policy. To this end, in various embodiments, a firewall policy enforcer deployed alongside a recipient entity acts as a defender that ensures compliance with applicable identity-based firewall policies.

In an embodiment, an outgoing packet sent by a sender entity is intercepted. Based on an applicable firewall policy for the sender entity, an entity identifier of the sender entity is determined. The entity identifier is encoded as a numeric value. Data including the encoded entity identifier is added to a header of the intercepted packet. In a further embodiment, the encoded entity identifier is added to an optional extension field (e.g., an Options field in TCP). The modified intercepted packet is forwarded to its destination.

In another embodiment, one or more incoming packets sent to a recipient entity by a sender are intercepted. Any packets without optional extension fields in their respective headers are rejected. A message authenticator (e.g., a message authentication code [MAC] such as a hash-based MAC [HMAC]) of each intercepted packet is verified by comparing the message authenticator to a known value determined based on the entity identifier of the sender. When the message authenticator is verified, the entity identifier is decoded, and normal operations resume in accordance with the firewall policy. When the message authenticator is not verified, one or mitigation actions such as terminating communications with an entity that sent the packet may be performed.

The disclosed embodiments allow for providing implementations for securely sending entity metadata that are compliant with specifications such as, but not limited to, Requests for Comment (RFC). In particular, brute-force attacks will not succeed because the time of sending is virtually encoded in the message.

The disclosed embodiments provide various advantages such as allowing for a protocol-agnostic approach for sending identity information and, in particular, for providing a transport layer security (TLS) compatibility. Further, the disclosed embodiments improve performance as compared to using an identity proxy in order to enforce firewall policies. More specifically, the disclosed embodiments use 1 intercepted packet rather than multiple intercepted packets as would be required for an existing solution utilizing a proxy. Additionally, as opposed to existing tunnel-based solutions, the disclosed embodiments may be utilized in applications requiring compliance with TCP RFC and do not require an agent installed on the receiving side.

Figure 1A:
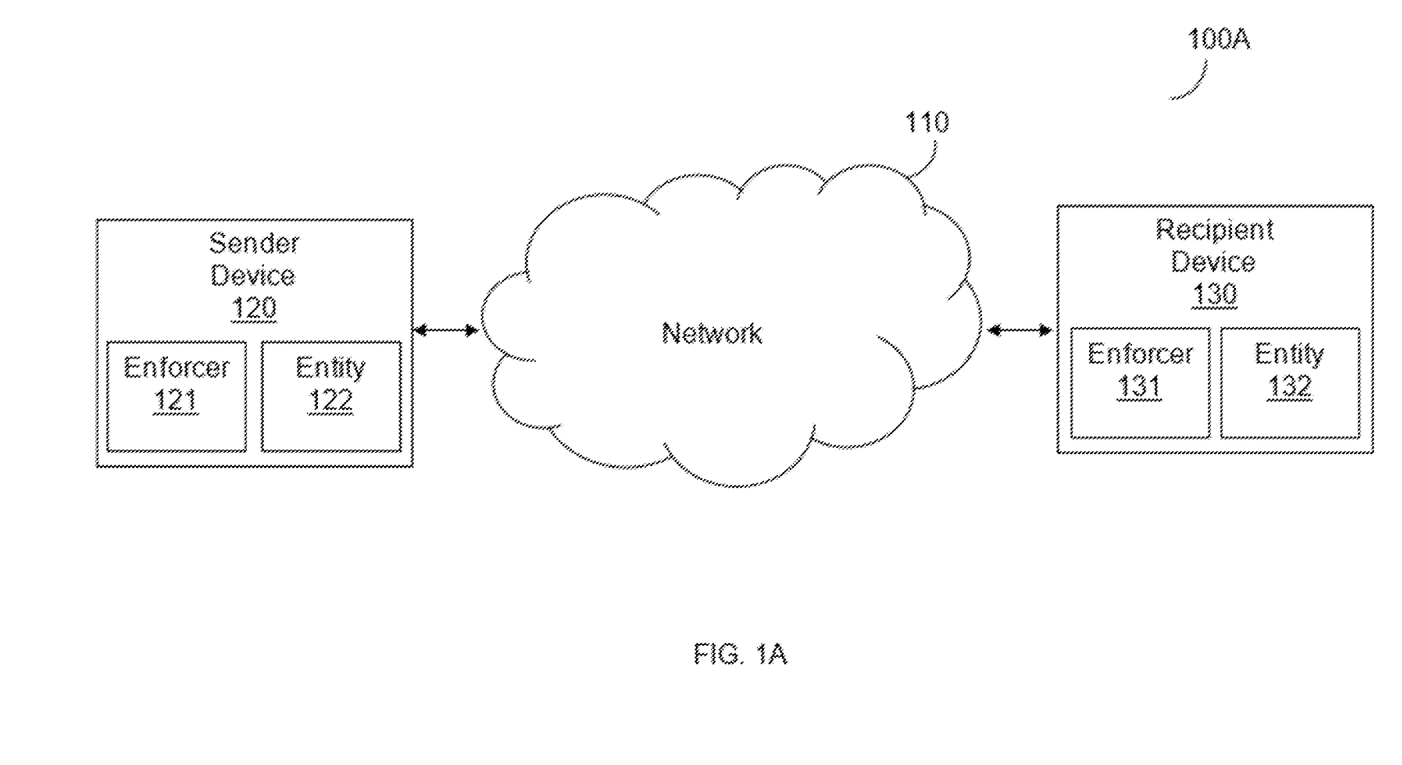
FIGS. 1A-B are network diagrams utilized to describe various disclosed embodiments.

FIG. 1A shows an example network diagram 100A utilized to describe the various disclosed embodiments. In the example network diagram 100, a sender device 120 and a recipient device 130 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the sender device 120 and the recipient device 130 may be, but is not limited to, a server, personal computer, a laptop, a tablet computer, a smartphone, a wearable computing device, and the like. In the example implementation shown in FIG. 1A, the sender device 120 includes a firewall policy enforcer 121 and a sender entity 122. The recipient device 130 includes a firewall policy enforcer 131 and a recipient entity 132. Each enforcer 121 or 131 may be realized as an agent or other software installed on the sender device 120 that includes instructions for performing at least a portion of the disclosed embodiments. In an example implementation, each enforcer 121 or 131 may be a software container.

Each of the sender entity 122 and the recipient entity 132 may be, but is not limited to, a host, an image, an application, a namespace, a cluster, and the like. In an example implementation, each entity 122 or 132 is a cloud native object. The sender device 120 is a system or portion thereof which is external relative to the recipient device 130, i.e., the sender device 120 is not part of the recipient device 130. The recipient entity 132 is a protected entity that is subject to one or more applicable firewall policies. In accordance with the disclosed embodiments, the applicable firewall policies uniquely identify trusted entities and may define rules for communications between the trusted entities.

The sender entity 122 and the recipient entity 132 communicate such that various firewall policies may not permit communications between the entities 122 and 132 depending on the identity of the sender entity 122, the channels through which the entities 122 and 132 communicate, both, and the like. To this end, the disclosed embodiments provide techniques for identity-based firewall policy evaluation allowing for enforcement of such firewall policies.

Each policy enforcer 121 or 131 is configured to perform at least a portion of the disclosed embodiments. In an example implementation, the policy enforcer 121 is at least configured to encode identity identifiers (e.g., as described below with respect to FIG. 2) and the policy enforcer 131 is at least configured to perform identity-based policy evaluation (e.g., as described below with respect to FIG. 3). It should be noted that each policy enforcer 121 or 131 may be configured to perform both the method described below with respect to FIG. 2 and the method described below with respect to FIG. 3 such that each of the devices 120 and 130 may act as either a sender or a recipient in any given communication.

Figure 1B:
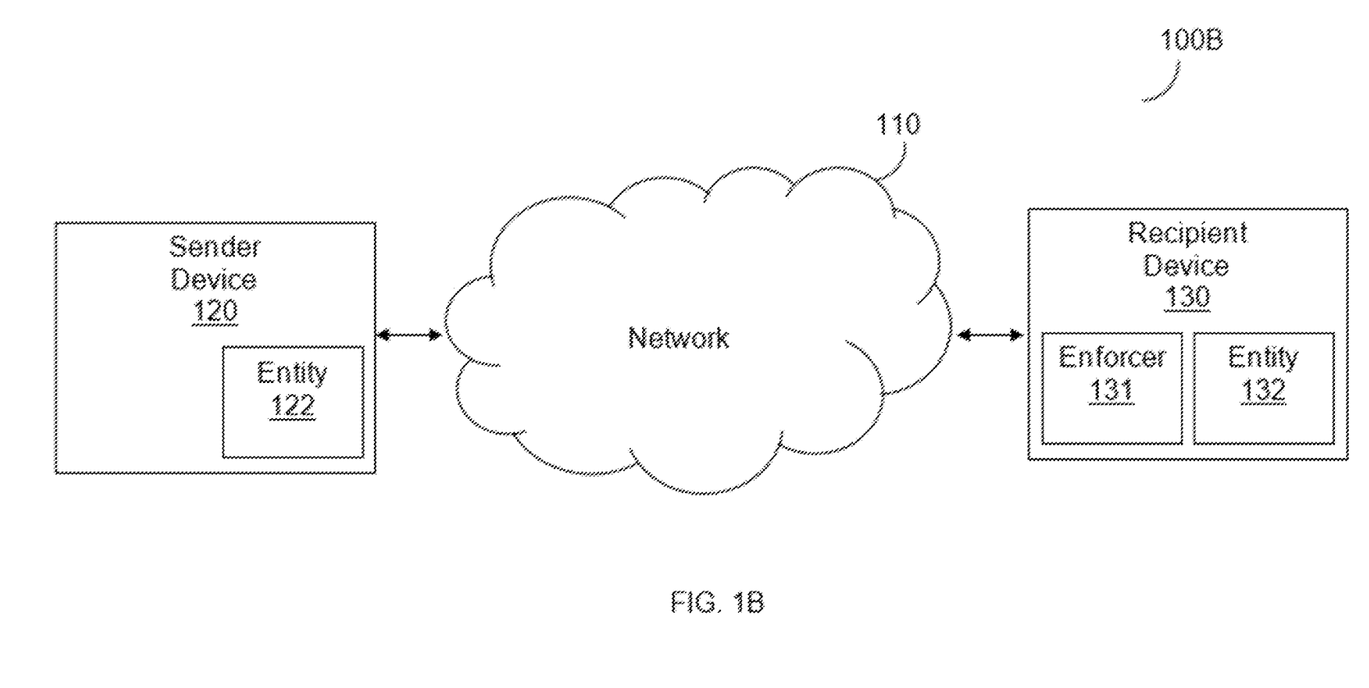

When the sender device 120 is not trusted by the owner of the recipient device 130, the sender device 120 will not have a firewall policy enforcer 121 utilizing the same entity identifiers for trusted entities as the firewall policy enforcer 131. Such an implementation is shown in FIG. 1B. According to various disclosed embodiments, when the sender device 120 does not encode entity identifiers for packets sent by the sender entity 122, packets sent to the recipient device 130 will lack any entity identifiers used by the enforcer 131 during entity-based policy evaluation and, as a result, such packets will be determined as unverified.

It should be noted that a single sender entity 122 and a single recipient entity 132 are shown in FIGS. 1A-B merely for simplicity purposes, but that the disclosed embodiments may be equally applicable to protect multiple recipient entities, and that the disclosed embodiments may be utilized to protect each recipient entity from any number of sender entities. Each sender entity that is permitted to communicate with a recipient entity may communicate with a corresponding firewall policy enforcer in order to send messages for which encoded entity identifiers should be added.

It should further be noted that the firewall policy enforcers 121 and 131 are shown as being integrated in the same devices as their respective entities in FIGS. 1A-B, but that the policy enforcers 121 and 131 may be deployed in distinct devices as their respective entities 122 and 132 without departing from the scope of the disclosed embodiments. In such implementations (not shown), each policy enforcer and each entity may be, or may be included in, a hardware device such as a server or user device (e.g., a mobile device, a tablet, a wearable computing device, a laptop computer, a desktop computer, etc.).

Figure 2:
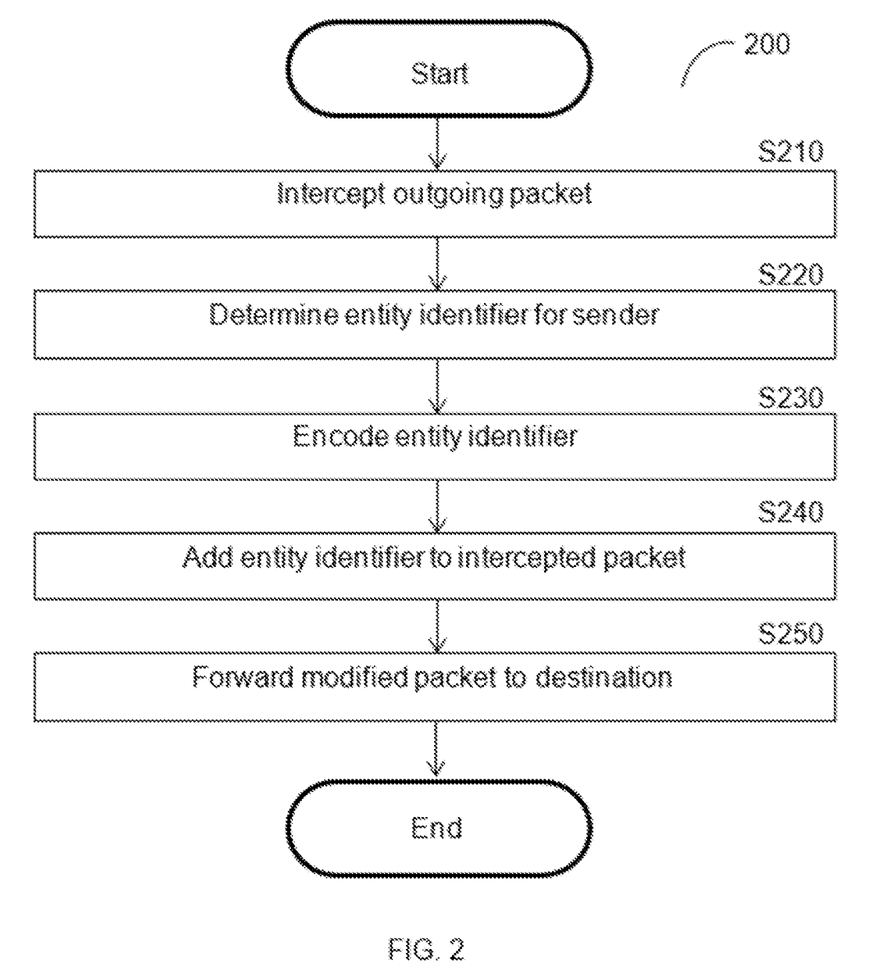
FIG. 2 is a flowchart illustrating a method for encoding entity identifiers for use in identity-based firewall policy evaluation according to an embodiment.

FIG. 2 is an example flowchart 200 illustrating a method for encoding entity identifiers for use in identity-based firewall policy evaluation according to an embodiment. In an embodiment, the method is performed by the firewall policy enforcer 121, FIG. 1.

At S210, an outgoing packet sent by a sender entity (e.g., the sender entity 122, FIGS. 1A-B) is intercepted. The outgoing packet is directed to a destination. The packet is a collection of data including a data payload and metadata. The data payload is the data desired to be communicated to the destination, and the metadata includes data about the packet which may be used for security and other communication purposes. The metadata may be included in a header of the packet.

At S220, an entity identifier of the sender entity is determined based on an applicable firewall policy for the sender entity.

The firewall policy defines a unique entity identifier for each of multiple entities including the sender entity as well as one or more allowed or forbidden circumstances for communication among the multiple entities. Each entity identifier is unique among entity identifiers defined in the firewall policy. The allowed or forbidden circumstances may include, but are not limited to, pairs of specific entities which are allowed to or forbidden from communicating with each other, entities which are allowed to communicate with untrusted services or systems, allowable or forbidden communication channels or endpoints for each pair of entities which are allowed to communicate each other, combinations thereof, and the like.

At S230, the entity identifier is encoded as a numeric value. In an example implementation, the entity identifier is encoded based on an order of the sender entity in the list of entity identifiers defined in the firewall policy.

In this regard, it is noted that firewall policy language may enable rich syntax to be used for defining entities. For example, such syntax may allow for defining entities based on use of a specific operating system with a specific application or entities deployed in a given cloud region. The numeric value, therefore, may be utilized to efficiently transfer information such as this between firewall policy enforcers.

At S240, a signature determined based on the encoded entity identifier is added to a header of the intercepted packet. In an embodiment, the signature includes the numeric value created at S230 and a message authenticator. The message authenticator may be, but is not limited to, a Message Authentication Code (MAC) such as a hash-based MAC (HMAC). In an example implementation, such a signature may be in the following form:

<numeric_entity_id>,HMAC
    (<numeric_entity_id>‖seconds_from_epoch)

In the form shown above, "numeric_entity_id" is the encoded entity identifier numeric value and "seconds_from_epoch" is an amount of time since the epoch. The epoch is a reference date and time from which the sender entity measures time such that the amount of time since the epoch is a time at which the packet was sent relative to the reference date and time. In an example implementation, the time used for the epoch may be split into 1 second intervals such that any given time measured since the epoch is even divisible into seconds. Encoding a time inside a message increases security, particularly in case of a brute-force attack directed at the recipient.

In some implementations, S240 may further include taking the result of computing the HMAC and removing all but the last predetermined number of bits (e.g., only the last 40 bits of the HMAC result is retained as the message authenticator portion of the signature). In this regard, it has been identified that packets used for communications between entities have limited sizes of data that can be used for non-communication data such as the signature. To this end, it has been identified that the signature can be sufficiently unique for a given packet by retaining only a limited portion of the signature. Thus, the disclosed embodiments allow for conserving packet space while providing sufficient security.

In a further embodiment, S240 may also include adding a challenge (e.g., a challenge according to the challenge handshake protocol) to the packet. Adding a challenge to the packet makes the recipient less susceptible to man-in-the-middle attacks by providing an additional layer of authentication for the packet.

It should be noted that the signature solution described above with respect to S240 assumes that all firewall policy enforcers involved in communications share a common private key. However, in some embodiments, an asymmetric solution in which different firewall policy enforcers have different private keys. To this end, in such an embodiment, a different private/public key pair is distributed for each firewall policy enforcer and S240 further includes encoding a sender identifier corresponding to the firewall policy enforcer which forwarded the packet into the packet. The sender identifier is, in turn, utilized to determine which public key should be used to decrypt the packet. As a non-limiting example, if agent 1 sends a packet to agent 3, a 1-byte identifier representing agent 1 is encoded into a header of the packet by agent 1, and agent 3 will verify a signature of the packet using the public key of agent 1.

At S250, the modified packet is forwarded to its destination. The destination may be a recipient entity such as the recipient entity 132 in the recipient device 130, FIGS. 1A-B.

In some implementations, the forwarded packet may be dropped if no response is received from the destination within a predetermined period of time.

Figure 3:
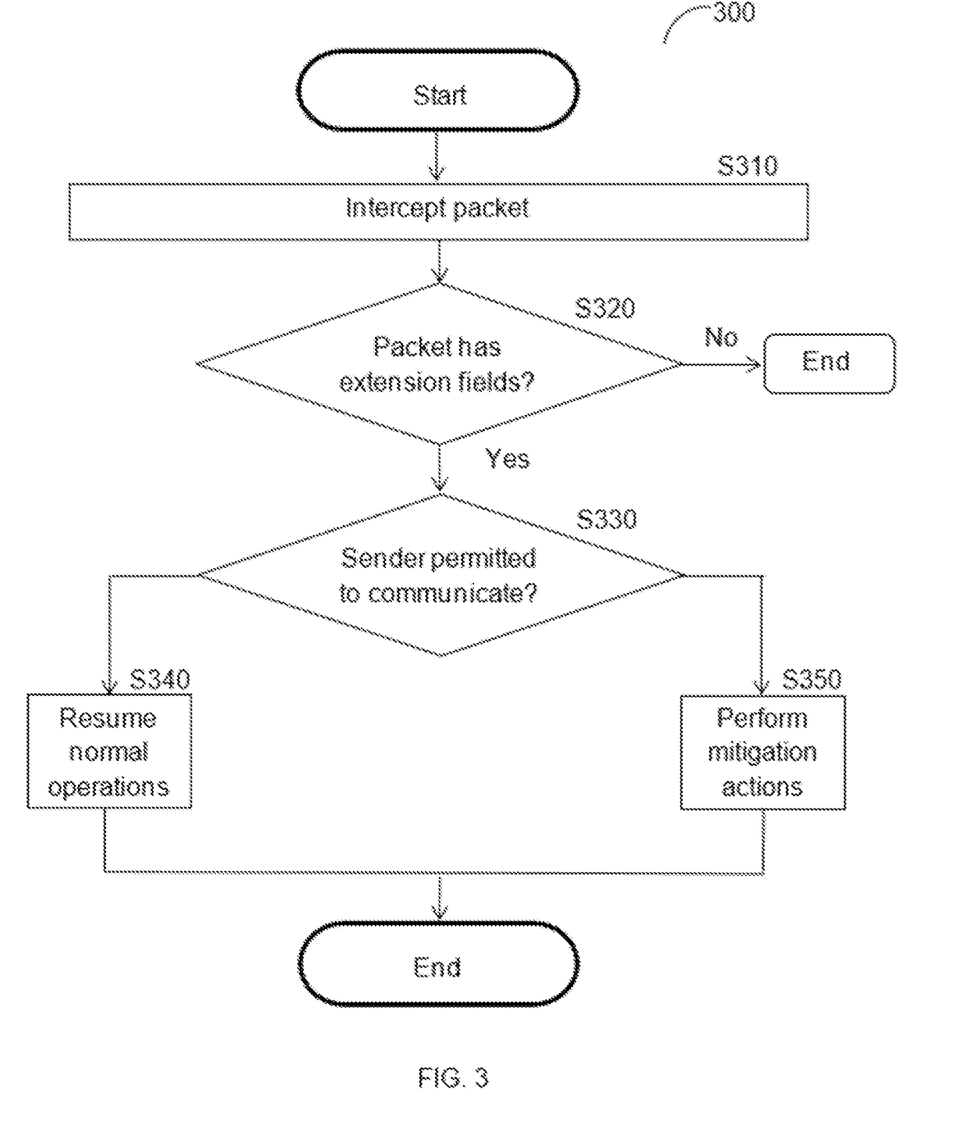
FIG. 3 is a flowchart illustrating a method for identity-based firewall policy evaluation according to an embodiment.

FIG. 3 is an example flowchart 300 illustrating a method for identity-based firewall policy evaluation according to an embodiment. In an embodiment, the method is performed by the firewall policy enforcer 131, FIG. 1.

At S310, an incoming packet sent to a recipient entity (e.g., the recipient entity 132, FIGS. 1A-B) by a sender entity (e.g., the sender entity 122, FIGS. 1A-B) is intercepted. The packet is a collection of data including a data payload and metadata. The data payload is the data desired to be communicated to the destination, and the metadata includes data about the packet which may be used for security and other communication purposes.

In some implementations, the incoming packet may be dropped if the response is received from a Domain Name System not included in a whitelist of an applicable policy.

At optional S320, it is determined whether the intercepted packet has extension fields and, if so, execution continues with S330; otherwise, it is determined that the sender entity is not permitted to communicate with the recipient entity according to applicable firewall policies and execution terminates. The extension fields may be included in the metadata and, in particular, in an extension field of a header of the packet. In an embodiment, S320 may only occur when the recipient entity is not allowed to receive communications from untrusted entities such as third party services according to an applicable firewall policy.

In this regard, it is noted that the disclosed embodiments utilize extension fields at least in order to determine whether a signature generated based on the entity identifier of the sender entity matches a value computed based on an entity identifier of a trusted entity indicated in a firewall policy applicable to the recipient entity. To this end, if the packet lacks extension fields, it may be determined that the packet will not meet the firewall policy requirements and, therefore, further processing may be skipped. This, in turn, conserves computing resources from packets which cannot meet the firewall policy by skipping analysis of any potential entity identification data.

At S330, when it is determined that the intercepted packet has extension fields, it is determined if the sender entity is permitted to communicate with the recipient entity in accordance with an applicable firewall policy. If so, execution continues with S340; otherwise, execution continues with S350.

The firewall policy defines a unique entity identifier for each of multiple entities including the recipient entity as well as one or more allowed or forbidden circumstances for communication among the multiple entities. Each entity identifier is unique among entity identifiers defined in the firewall policy, i.e., no two entity identifiers used by the firewall policy are the same. The allowed or forbidden circumstances may include, but are not limited to, pairs of specific entities which are allowed to or forbidden from communicating with each other, entities which are allowed to communicate with untrusted services or systems, allowable or forbidden communication channels or endpoints for each pair of entities which are allowed to communicate each other, combinations thereof, and the like.

As an example for an allowable circumstance which may be defined in the firewall policy, a frontend for a service may be permitted to communicate with a database acting as a sender entity over a particular port (e.g., port 80). To this end, in such an example, the firewall policy includes entity identifiers for the frontend and for the database along with a policy that these entities may communicate over port 80.

As another non-limiting example for an allowable circumstance which may be defined in the firewall policy, a host for a service may be permitted to communicate with one or more third party services identified by respective domain names. To this end, in such an example, the firewall policy includes an entity identifier for the host along with a policy that this entity may communicate with untrusted entities and the respective domain names via which this entity is permitted to communicate with the untrusted entities.

Verifying a message authenticator in the packet allows for ensuring that packets are treated accordingly when sent by trusted or untrusted entities, or via approved or unapproved channels. Information related to entity identifiers of entities which are trusted and therefore allowed to communicate with the recipient entity may be defined in a firewall policy.

In an embodiment, verifying the message authenticator includes comparing the message authenticator to a value computed based on the entity identifier indicated in a signature of the packet and an epoch. In this regard, it is noted that, when the packet is prepared as described herein (for example, as described above with respect to FIG. 2), the packet will include a signature in the header. The signature indicates an entity identifier of the entity which sent the packet and a message authenticator computed based on that entity identifier and a current time (e.g., a time in seconds) relative to an epoch. To this end, in a further embodiment, S330 includes computing this value.

In an example implementation, the message authenticator is verified by comparing the message authenticator to one of the following for each entity identifier indicated in the firewall policy:
   a) HMAC(<numeric_entity_id>||seconds_from_epoch−1)
   b) HMAC(<numeric_entity_id>||seconds_from_epoch)
   c) HMAC(<numeric_entity_id>||seconds_from_epoch+1)

Which value the message authenticator is compared to may depend, for example, on an expected or actual latency of communications between the entities. In this regard, it is noted that, in an embodiment, the sender entity and the recipient entity are synchronized such that the epoch of both entities is the same. In a further embodiment, the epochs may be the same when the epochs are within 1 second of each other such that the disclosed embodiments accommodate some degree of clock skews.

In an embodiment, S320 may further include checking whether the intercepted packet is received from a third party service that is permissible in accordance with applicable firewall policies. If so, it may be determined that the sender entity is permitted to communicate with the recipient entity. To this end, in an example implementation, the firewall policy may define a whitelist of third party services indicated by IP address, and Domain Name Service (DNS) entries are cached such that it can be determined whether an IP of the sender entity belongs to a whitelisted service, and each packet is resolved against the cache. Such checking may allow for supporting third party rules. In some implementations, if the IP address is not whitelisted or the metadata of the packet does not fit an allowed entity list, mitigation actions performed at S350 may include dropping the connection.

At S340, when the intercepted packet has been verified, the entity identifier is decoded and normal communication operations may resume in accordance with applicable firewall policies. To this end, in an embodiment, S340 further includes forwarding the intercepted packet to the recipient entity.

In an embodiment, S340 further includes checking to ensure that the packet complies with any applicable firewall policies for the recipient. As noted above, a firewall policy defines appropriate circumstances for communications between the entity represented by the message authenticator and the recipient entity. Thus, in a further embodiment, S340 may also include checking whether a communication channel through which the packet or an endpoint through which the packet was sent is permitted for communications between the sender and the recipient. If the communication channel used to send the packet is not permitted by the firewall policy, one or more mitigation actions may be performed. The mitigation actions may include, but are not limited to, rejecting the packet, sending a notification to the sender entity indicating that a different communication channel should be used, both, and the like.

At S350, when the intercepted packet is not verified, one or more mitigation actions are performed. The mitigation actions may include, but are not limited to, rejecting the packet, terminating communications with a sender of the packet (e.g., by turning off a port through which the packet was received), blacklisting the address (e.g., an Internet Protocol address) from which the packet was sent, reconfiguring a load balancer to cease forwarding packets from the sender entity to the recipient entity, combinations thereof, and the like.

In this regard, it is noted that the disclosed embodiments only require a single packet in order to identify whether communications between the entities are permitted. In particular, when impermissible communications are identified and mitigation includes blocking further communications between the entities, the disclosed embodiments can significantly reduce the total number of packets analyzed (particularly compared to existing solutions which require analyzing thousands of packets), thereby improving time of mitigation and reducing the total amount of computing resources devoted to such analyses.

Figure 4:
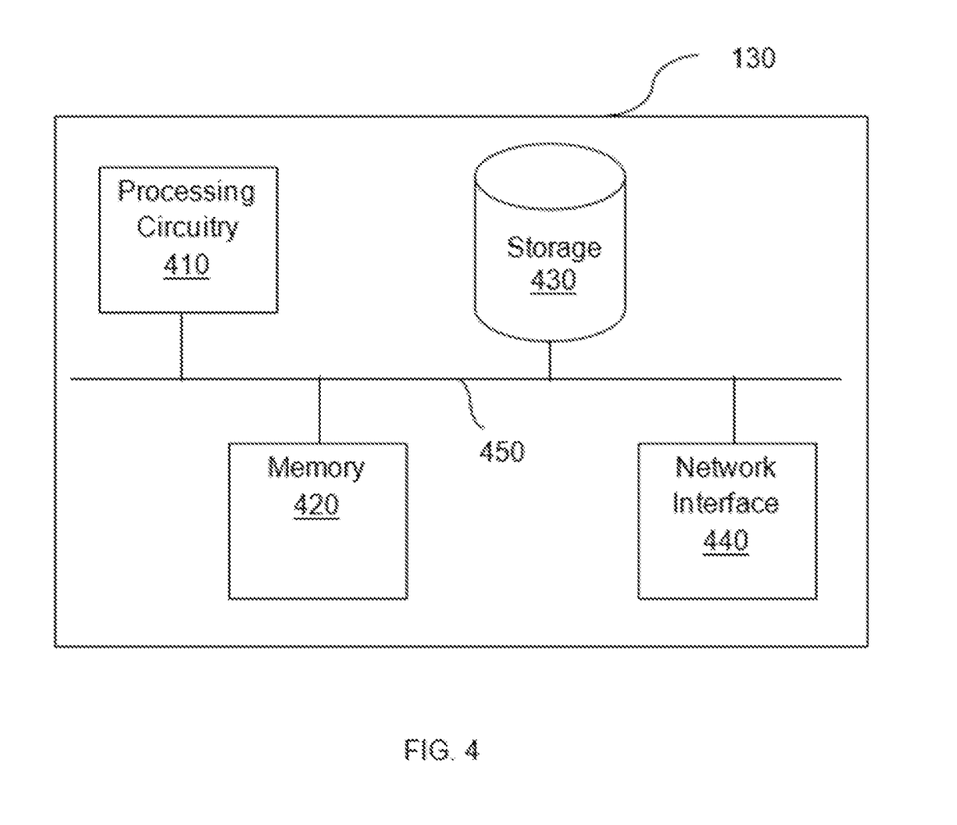
FIG. 4 is a schematic diagram of a firewall policy enforcer according to an embodiment.

FIG. 4 is an example schematic diagram of hardware 400 of a host device (e.g., the sender device 120 or the recipient device 130, FIG. 1) utilized to implement a firewall policy enforcer (e.g., the firewall policy enforcer 121 or 131, FIG. 1) according to an embodiment. The sender device 120, the recipient device 130, or both, FIGS. 1A-B, may be configured as the device 400. The device 400 includes a processing circuitry 410 coupled to a memory 420, a storage 430, and a network interface 440. In an embodiment, the components of the firewall policy enforcer 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform at least a portion of the various processes described herein. The instructions also cause the processing circuitry 410 to perform activities of a respective entity (e.g., the entity 122 or 132, FIGS. 1A-B).

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the device 400 to communicate with other devices for purposes such as, but not limited to, receiving packets, sending packets, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

The invention claimed is:

1. A method comprising:
   intercepting a first packet incoming to a first entity, wherein the first packet comprises metadata;
   based on determining that the metadata of the first packet comprise an extension header, determining whether the first packet can be verified, wherein the determination of whether the first packet can be verified comprises determining whether the extension header comprises a signature that includes an encoded identifier of a sender entity of the first packet;
   in response to determining that the first packet can be verified based on determining that the extension header comprises the signature that includes the encoded identifier of the sender entity of the first packet, determining based on a firewall policy whether the sender entity and the first entity are permitted to communicate, wherein determining whether the sender entity and the first entity are permitted to communicate comprises:
      decoding the encoded identifier to obtain an identifier of the sender entity, wherein the identifier of the sender entity was determined for the sender entity based on the firewall policy and differs from an Internet Protocol (IP) address of the sender entity; and
      evaluating the first packet for compliance with the firewall policy based on the identifier of the sender entity, wherein the firewall policy comprises rules for communications of a plurality of entities based on a plurality of identifiers of a corresponding plurality of entities, wherein the plurality of identifiers are unique to respective ones of the plurality of entities and differs from IP addresses of the plurality of entities, and wherein the plurality of identifiers includes the identifier of the sender entity; and
   in response to determining that the first packet cannot be verified based on determining that the extension header does not comprise the signature that includes the encoded identifier of the sender entity of the first packet or that the metadata of the first packet do not comprise an extension header, performing one or more mitigation actions.

2. The method of claim 1, wherein determining if the first packet can be verified comprises determining if the signature also includes a message authenticator that can be verified.

3. The method of claim 2, wherein the message authenticator comprises a first message authentication code (MAC), wherein determining if the signature also includes a message authenticator that can be verified comprises,
   determining that the signature comprises a first MAC;
   computing a value based on the encoded identifier and a current time relative to an epoch; and
   determining if the first MAC matches the computed value based on comparing the first MAC to the computed value.

4. The method of claim 3,
wherein determining that the first packet can be verified comprises determining that the first MAC matches the computed value,
wherein determining that the first packet cannot be verified comprises determining that the first MAC does not match the computed value.

5. The method of claim 3, wherein computing the value comprises computing a second MAC based on the encoded identifier and the current time relative to the epoch, wherein determining if the first MAC matches the computed value comprises determining if the first MAC matches the second MAC.

6. The method of claim 1, further comprising:
based on intercepting the first packet when outbound from the sender entity, encoding the identifier of the sender entity to obtain the encoded identifier;
adding the signature in an extension header field of the first packet; and
forwarding the first packet toward the first entity.

7. The method of claim 6, further comprising computing a message authenticator based on the encoded identifier, wherein the signature added in the extension header field comprises the encoded identifier and the message authenticator.

8. The method of claim 6, wherein the encoded identifier is a numeric value, wherein encoding the identifier of the sender entity comprises encoding the identifier based on an order of the sender entity in a listing of the plurality of identifiers defined for the firewall policy.

9. The method of claim 1, wherein performing the one or more mitigation actions comprises at least one of rejecting the first packet, terminating communications with the sender entity, blacklisting a network address from which the first packet was sent, and reconfiguring a load balancer to cease forwarding of packets from the sender of entity to the first entity.

10. The method of claim 1, wherein the plurality of identifiers also comprises an identifier of the first entity, wherein evaluating the first packet for compliance with the firewall policy comprises evaluating the firewall policy based on the identifier of the sender entity and the identifier of the first entity to determine if communications between the sender entity and the first entity are permitted.

11. One or more non-transitory machine-readable media having program code stored thereon, the program code comprising instructions executable by a processor to cause the processor to:
intercept a first packet destined for a first entity;
based on a determination that metadata of the first packet comprise an extension header, determine whether the first packet can be verified, wherein the instructions to determine whether the first packet can be verified comprise instructions to determine whether the extension header comprises a signature that includes an encoded identifier of a sender of the first packet;
in response to a determination that the first packet can be verified based on a determination that the extension header comprises the signature that includes the encoded identifier of the sender of the first packet, determine based on a firewall policy whether the sender of the first packet is permitted to communicate with the first entity, wherein the instructions to determine whether the sender of the first packet is permitted to communicate with the first entity comprise instructions to:
decode the encoded identifier to obtain an identifier of the sender of the first packet, wherein the identifier of the sender was determined for the sender of the first packet based on the firewall policy and differs from an Internet Protocol (IP) address of the sender; and
evaluate the first packet for compliance with the firewall policy based on the identifier of the sender, wherein the firewall policy comprises rules for communications of a plurality of entities based on a plurality of identifiers of a corresponding plurality of entities, wherein the plurality of identifiers differs from IP addresses of the plurality of entities and are unique to corresponding ones of the plurality of entities, and wherein the plurality of identifiers includes the identifier of the sender; and
in response to a determination that the first packet cannot be verified based on a determination that the extension header does not comprise the signature that includes the encoded identifier of the sender of the first packet or that the metadata of the first packet do not comprise an extension header, perform one or more mitigation actions.

12. The non-transitory machine-readable media of claim 11, wherein the instructions to determine whether the first packet can be verified further comprise instructions to determine whether a message authenticator included in the signature can be verified.

13. The non-transitory machine-readable media of claim 12, wherein the message authenticator comprises a message authentication code (MAC), wherein the instructions to determine whether the message authenticator can be verified comprise instructions to compute a value based on the encoded identifier and a current time relative to an epoch and compare the MAC included in the signature to the computed value to determine if the MAC matches the computed value.

14. The non-transitory machine-readable media of claim 11, wherein the signature also includes a message authenticator, and wherein the program code further comprises instructions to:
based on interception of the first packet when outbound from the sender, encode the identifier of the sender to obtain the encoded identifier;
compute the message authenticator based on the encoded identifier;
add the signature in a field of an extension header of the first packet; and
forward the first packet toward the first entity.

15. The non-transitory machine-readable media of claim 11, wherein the instructions to perform the one or more mitigation actions comprise at least one of instructions to reject the first packet, instructions to terminate communications with the sender of the first packet, instructions to blacklist a network address from which the first packet was sent, and instructions to reconfigure a load balancer to cease forwarding of packets from the sender of the first packet to the first entity.

16. An apparatus comprising:
a processor; and
a non-transitory machine-readable medium having instructions stored thereon that are executable by the processor to cause the apparatus to:
intercept a first packet destined for a first entity, wherein the first packet comprises metadata;
based on a determination that the metadata of the first packet comprise an extension header, determine whether the first packet can be verified, wherein the instructions to determine if the first packet can be verified comprise instructions to determine whether the extension header comprises a signature that includes an encoded identifier of a sender entity of the first packet;

in response to a determination that the first packet can be verified based on a determination that the extension header comprises the signature that includes the encoded identifier of the sender entity of the first packet, determine whether the sender entity is permitted to communicate with the first entity based on a firewall policy, wherein the instructions to determine if the sender entity is permitted to communicate with the first entity comprise instructions to:

decode the encoded identifier to obtain an identifier of the sender entity that was determined for the sender entity based on the firewall policy and differs from an Internet Protocol (IP) address of the sender entity; and     evaluate the first packet for compliance with the firewall policy based on the identifier of the sender entity, wherein the firewall policy comprises rules for communications among a plurality of entities based on a plurality of identifiers unique to corresponding ones of a plurality of entities, wherein the plurality of identifiers differs from IP addresses of the plurality of entities, and wherein the plurality of entities includes the sender entity and the plurality of identifiers includes the identifier of the sender entity; and in response to a determination that the first packet cannot be verified based on a determination that the extension header does not comprise the signature that includes the encoded identifier of the sender entity of the first packet or that the metadata of the first packet does not comprise an extension header, perform one or more mitigation actions.

17. The apparatus of claim 16, wherein the instructions executable by the processor to cause the apparatus to determine if the first packet can be verified comprise instructions executable by the processor to cause the apparatus to determine if the signature includes a message authenticator and determine if the message authenticator can be verified.

18. The apparatus of claim 17, wherein the instructions executable by the processor to cause the apparatus to determine if the message authenticator can be verified comprise instructions executable by the processor to cause the apparatus to,     determine that the signature comprises a first message authentication code (MAC);

compute a value based on the encoded identifier and a current time relative to an epoch; and     compare the first MAC included in the signature to the computed value to determine if the first MAC matches the computed value.

19. The apparatus of claim 18, wherein the instructions executable by the processor to cause the apparatus to compute the value comprise instructions to compute a second MAC based on the encoded identifier and the current time, and wherein the instructions executable by the processor to cause the apparatus to compare the first MAC to the computed value comprise instructions executable by the processor to cause the apparatus to compare the first MAC to the second MAC to determine if the first MAC matches the second MAC.

20. The apparatus of claim 16, wherein the instructions executable by the processor to cause the apparatus to perform one or more mitigation actions comprise instructions executable by the processor to cause the apparatus to perform at least one of rejection of the first packet, termination of communications with the sender entity, blacklisting of a network address from which the first packet was sent, and reconfiguration of a load balancer to cease forwarding of packets from the sender entity to the first entity.

\* \* \* \* \*